United States Patent [19]

DeBiasi et al.

[11] Patent Number: 5,151,842
[45] Date of Patent: Sep. 29, 1992

[54] SWITCHBOARDS AND PANELBOARDS HAVING INTERLOCK AND LOAD SELECTION CAPABILITIES

[75] Inventors: Mark S. DeBiasi, Windsor; Richard A. Menelly, Burlington, both of Conn.

[73] Assignee: General Electric Company, New York, N.Y.

[21] Appl. No.: 687,649

[22] Filed: Apr. 19, 1991

[51] Int. Cl.[5] .................. H02H 3/00; H02B 1/04
[52] U.S. Cl. ..................... 361/93; 361/353
[58] Field of Search .............. 361/93, 94, 95, 96, 361/115, 353

[56] References Cited

U.S. PATENT DOCUMENTS

| | | | |
|---|---|---|---|
| 4,468,714 | 8/1984 | Russell | 361/62 |
| 4,476,511 | 10/1984 | Saletta et al. | 361/96 |
| 4,589,052 | 5/1986 | Dougherty | 361/94 |
| 4,672,501 | 6/1987 | Bilac et al. | 361/96 |
| 4,754,247 | 6/1988 | Raymont et al. | 335/202 |
| 4,794,273 | 12/1988 | McCullough et al. | 307/139 |
| 4,858,056 | 8/1989 | Russell | 361/93 |
| 4,860,157 | 8/1989 | Russell | 361/156 |
| 4,894,631 | 1/1990 | Castonquay et al. | 335/167 |
| 4,991,042 | 2/1991 | Tokarski et al. | 361/93 |
| 5,051,861 | 9/1991 | Purkayastha et al. | 361/96 |

OTHER PUBLICATIONS

Ser. No. 674,475 entitled An Electronic Circuit Interrupter with Attached Terminal Connector Block", Filed Mar. 25, 1991, Lesslie et al. (Docket 41PR-6894).

*Primary Examiner*—Steven L. Stephan
*Assistant Examiner*—E. To
*Attorney, Agent, or Firm*—Richard A. Menelly

[57] ABSTRACT

Switchboard and panelboard enclosures include a main electronic circuit breaker interconnected with a plurality of branch circuit breakers by means of a corresponding plurality of terminal boards. Zone-Selective-Interlock and Load Selection functions are achieved by signals transmitted between the branch circuit breakers and the main circuit breaker. The accessories within the branch circuit breakers respond to tripping signals from the main circuit breaker to provide the Zone-Selective-Interlock and Load Selection functions.

5 Claims, 8 Drawing Sheets

FIG. 10

SWITCHBOARDS AND PANELBOARDS HAVING INTERLOCK AND LOAD SELECTION CAPABILITIES

BACKGROUND OF THE INVENTION

U.S. patent application Ser. No. 674,475 entitled "An Electronic Circuit Interrupter with Attached Terminal Connector Board" describes a main circuit breaker connected within a switchboard enclosure containing a plurality of branch circuit breakers. The main and branch circuit breakers each include individual terminal blocks that are arranged within the switchboard enclosure. The main and branch circuit breakers communicate with a central programming unit over a power-line communication network to provide supplemental protection features.

The branch circuit breakers described within the aforementioned U.S. Patent Application are so-called "smart" circuit breakers wherein each circuit breaker contains its own microprocessor and software support programs. The terminal boards connected with the individual circuit breakers provide the means for connecting with the power-line communication link that connects the central programming unit with the main and branch circuit breakers.

With Zone-Selective-Interlock function, wherein an upstream circuit breaker is restrained from responding to interrupt a protective circuit until a downstream circuit breaker closer to the source of the fault has responded, there must be some means for communicating between the upstream and downstream circuit breakers. U.S. Pat. No. 4,468,714 entitled "Zone Selective Interlock Module for Use with Static Trip Circuit Breakers" describes one such Zone-Selective-Interlock system using hard-wired connections between the upstream and downstream circuit breakers.

"Load Selection" as described herein concerns prioritizing the electrical equipment loads that are connected with distributed branch circuit breakers whereby selected circuit breakers are actuated to interrupt operating power to non-essential equipment while the operating power to those circuit breakers connected with essential equipment such as computers, emergency lighting and medical apparatus is maintained.

U.S. Pat. No. 4,672,501 entitled "Circuit Breaker and Protective Relay Unit" describes a "smart" circuit breaker which includes a microprocessor programmed to perform the Load Selection function.

U.S. Pat. No. 4,589,052 entitled "Digital I$^2$T Pickup, Time Bands and Timing Control Circuits for Static Trip Circuit Breakers" describes an electronic trip unit useful for overcurrent protection, which does not include a microprocessor. When such electronic trip units are used as branch circuit breakers it would be highly advantageous to provide such circuit breakers with Zone-Selective-Interlock and Load Selection Functions.

U.S. Pat. No. 4,991,042 entitled "Digital Circuit Interrupter with Keypad Data Entry and Display" describes a smart circuit breaker containing its own microprocessor and associated circuitry for entering trip parameters to the electronic trip unit and displaying the trip parameters along with voltage and ampere ratings, upon command.

Accordingly, one purpose of the invention is to use a smart circuit breaker as the main circuit breaker within a switchboard or panelboard enclosure along with a plurality of distributed branch circuit breakers containing electronic trip units such as described in the aforementioned U.S. Pat. No. 4,589,052.

SUMMARY OF THE INVENTION

A smart circuit breaker containing a microprocessor within its electronic trip unit is arranged as a main circuit breaker within a switchboard or panelboard enclosure. A plurality of branch circuit breakers containing electronic trip units without a microprocessor are electrically interconnected with the microprocessor within the main circuit breaker. Zone-Selective-Interlock and Load Selection functions are provided by operation of the shunt trip and auxiliary switch accessories contained within the branch circuit breakers.

DESCRIPTION OF THE PREFERRED EMBODIMENT

Figure 1:
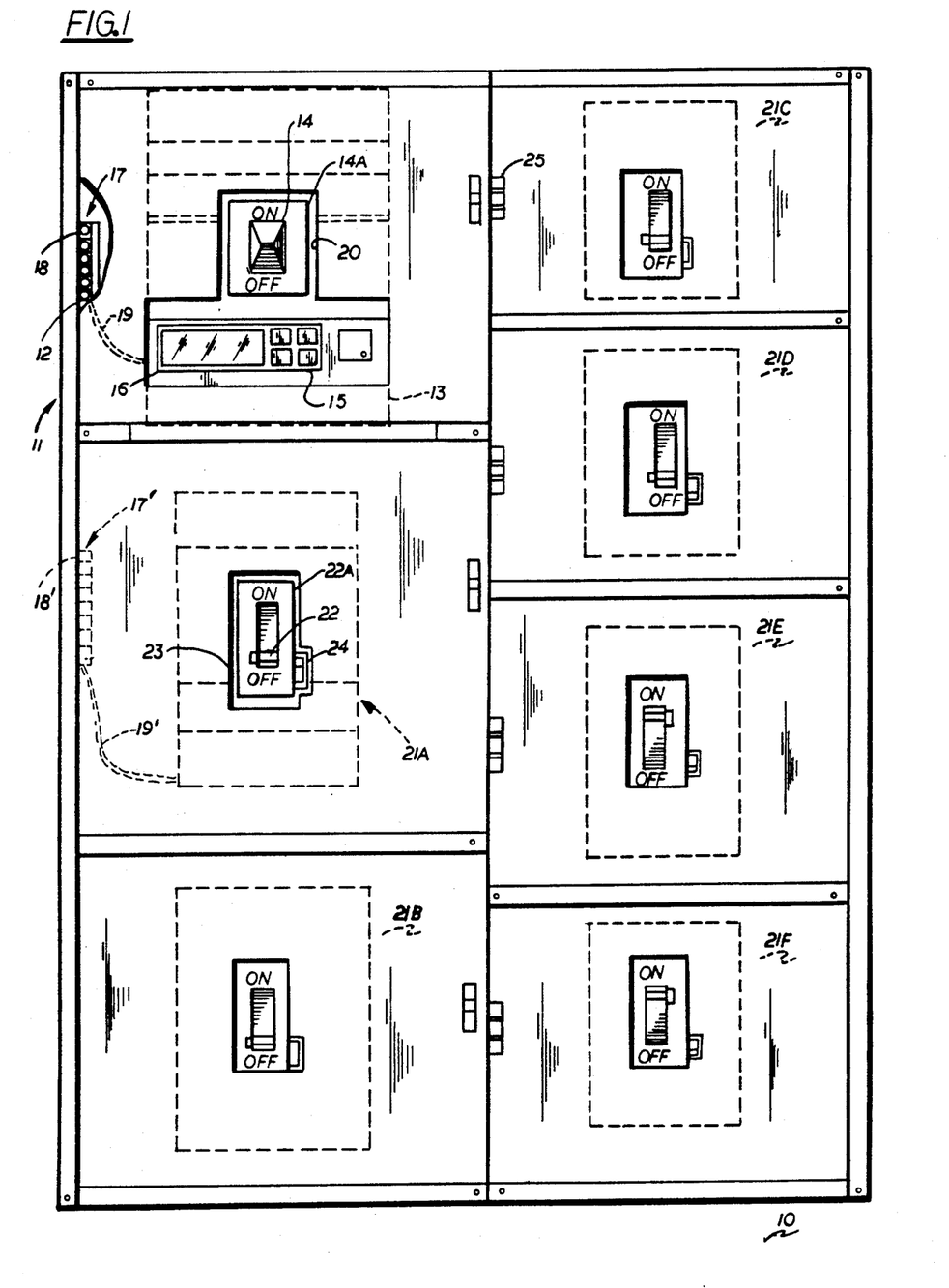
FIG. 1 is a front plan view of a switchboard or panelboard enclosure containing a main circuit breaker and distributed branch circuit breakers interconnected in accordance with the invention.

A switchboard or panelboard 10 of the type consisting of an extended metal enclosure 11 is shown in FIG. 1 and includes a plurality of closed compartments 12 that are accessible by means of a compartment handle 25. One of the compartments contains a main circuit breaker 13 similar to that described in the aforementioned U.S. Pat. No. 4,991,042 and includes a handle 14 extending from a handle escutcheon 14A and a keypad 15 along with a display 16. The handle, keypad and display are accessible through an inverted T-shaped slot 20 formed within the front surface of the compartment. As described within the aforementioned U.S. patent application Ser. No. 674,475 the main circuit breaker is connected to a terminal board 17 by means of a cable 19. The main terminal board includes a plurality of main terminals 18 that interconnect with corresponding branch terminals 18' associated with similar branch terminal boards 17'. The branch terminal boards each connect with one of the branch circuit breakers 21A by means of a similar cable 19'. The branch circuit breakers are similar to those described within U.S. Pat. No. 4,754,247 entitled "Molded Case Circuit Breaker Accessory Enclosure". Each of the branch circuit breakers has an operating handle 22 extending from the handle escutcheon 22A along with the trip-test button 24 which are both accessible through a slot 23 formed through a front surface of the compartment. Similar branch circuit breakers 21B-21F are located within the remaining closed compartments.

Figure 2:
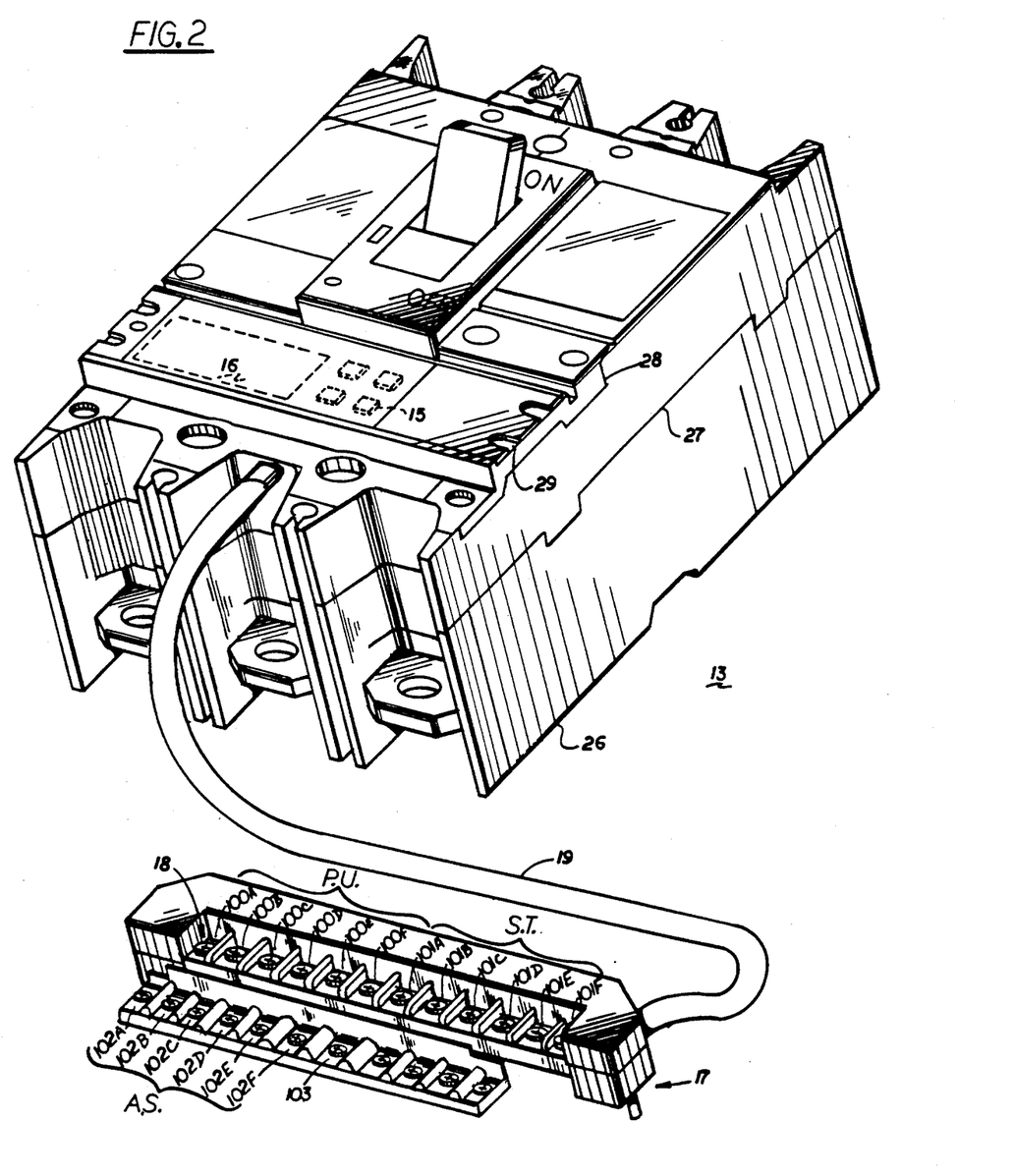
FIG. 2 is a top perspective view of the main circuit breaker used within the switchboard or panelboard enclosure of FIG. 1.

The main circuit breaker 13 is best seen by referring now to FIG. 2 wherein the main circuit breaker contains a case 26 to which a circuit breaker cover 27 is fixedly attached and which includes an accessory cover 28 attached to the circuit breaker cover. The keypad 15 and display 16 described within the aforementioned U.S. Pat. No. 4,991,042 are arranged under a protective plastic plate 29 and can be accessed for inputting and displaying the trip parameters by first removing the protective plate. As described in the aforementioned U.S. patent application Ser. No. 674,475 the terminal board 17 is connected to the load end of the main circuit breaker cover by means of the multi-conductor cable 19. Electrical connection with the electronic trip unit contained within the main circuit breaker cover is made by means of the terminals 18. For purposes to be described below in greater detail, the terminals 18 are allocated to the branch circuit breakers (21A-21F) by designating the terminal connectors 100 (A-F), 101 (A-F) and 102 (A-F) accordingly wherein the letters ("A-F") designate the (A-F) branches of the protected power circuit and the numerals (100-102) designate the Pick-Up (P.U.), Shunt Trip (S.T.) and Auxiliary Switch (A.S.) connectors. The group of terminal connectors 100 (A-F) designated "P.U." are allocated for connection with the pick-up indication terminals from electronic trip units within each of the associated branch circuit breakers. The group of terminal connectors 101 (A-F) designated "S.T." are allocated for connection with corresponding branch circuit breaker terminals connecting with the actuator-accessory units 33 (FIG. 3) contained within the branch circuit breaker covers. The group of terminal connectors 102 (A-F) designated "A.S." are allocated for connection with corresponding branch circuit breaker terminals connecting with the auxiliary switch units 40 (FIG. 3) contained within the branch circuit breaker covers. Terminal connector 103 connects with systems ground.

Figure 3:
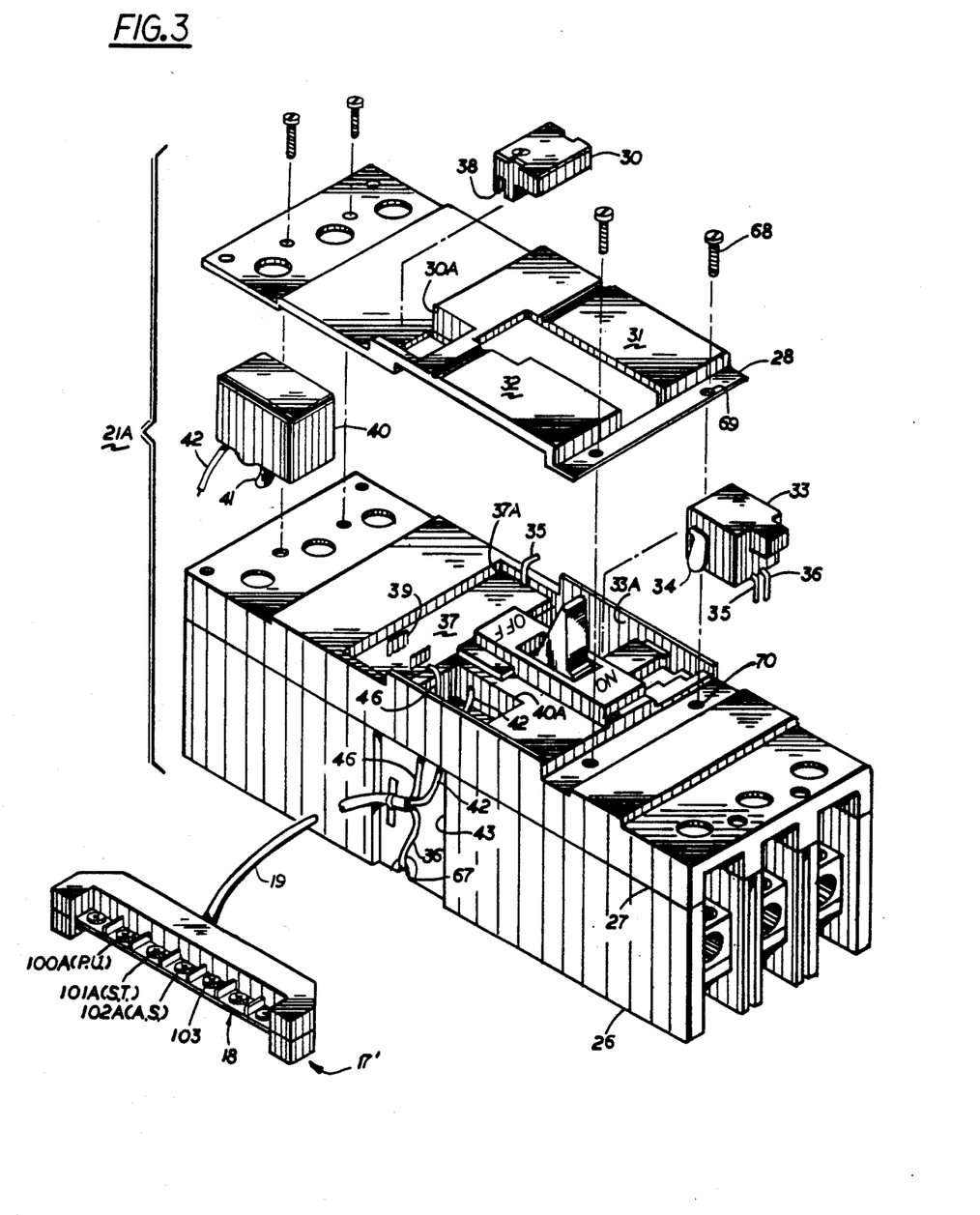
FIG. 3 is a top perspective view in isometric projection, of one of the branch circuit breakers used within the switchboard or panelboard enclosure of FIG. 1.

One of the branch circuit breakers 21A is depicted in FIG. 3 prior to final assembly. The branch circuit breaker has a similar case 26, cover 27 and accessory cover 28 as the main circuit breaker, described earlier and common reference numerals for both the main circuit breaker and branch circuit breaker components will be used where possible. An actuator-accessory unit 33 of the type described within U.S. Pat. No. 4,894,631 is positioned within the accessory-actuator recess 33A and interacts with the circuit breaker operating mechanism (not shown) by means of the actuator latch 34. The actuator-accessory unit responds to signals generated by the electronic trip unit 37 within the trip unit recess 37A over wire conductor 35 to articulate the circuit breaker operating mechanism and separate the circuit breaker contacts (not shown). The actuator-accessory unit also responds to trip signals generated from a remote location over the shunt-trip wire conductor 36 that passes under the branch circuit breaker through a slot 67 and then upwards within a wiring channel 43 formed within the case 26. The shunt-trip wire conductor passes through the multi-conductor cable 19 to the branch terminal board 17' and is electrically connected to one of the terminal connectors designated (101A) "S.T". The operation of the actuator-accessory unit 33 as a shunt-trip accessory is described within U.S. Pat. No. 4,858,056 entitled "Molded Case Circuit Breaker Actuator-Accessory Module". The electric circuit for controlling the operation of the actuator-accessory module as a shunt-trip accessory is found within U.S. Pat. No. 4,860,157 entitled "Molded Case Circuit Breaker Actuator-Accessory Module". An auxiliary switch accessory 40 is inserted within an auxiliary switch recess 40A also formed within the branch circuit breaker cover 27. The auxiliary switch interacts with the branch circuit breaker operating mechanism by means of an actuator lever 41 to provide a signal over the auxiliary switch wire conductor 42 which passes through an opening (not shown) in the bottom of the auxiliary switch recess 40A to the wiring channel 43 and then out to the branch terminal board 17' via cable 19. The auxiliary switch wire conductor 42 connects with another one of the terminal connectors designated (102A) "A.S.". The electronic trip unit 37 in the circuit breaker cover 27 electrically connects with the branch terminal board 17' by means of the pick-up indicator wire conductor 46 which exits through the bottom of the auxiliary switch recess 40A and the wiring channel 43 out through the cable 19 and connects with the end of the terminal designated (100A) "P.U.". The terminal connector 103 similarly connects with systems ground as described earlier. A rating plug 30 is inserted within the rating plug recess 30A formed in the accessory cover 28 and electrically connects with the trip unit 37 by means of sockets 38 formed on the bottom of the rating plug and upstanding pins 39 formed on the trip unit 37. The accessory cover 28 is securely fastened to the branch circuit breaker cover 27 by means of machine screws 68, thru-holes 69 and threaded openings 70 as indicated. Access to the actuator-accessory unit 33 is made by means of the accessory door 31 and access to the auxiliary switch 40 is made by means of the other accessory door 32. The remaining branch circuit breakers 21B-21F also have similar terminals 18 containing corresponding terminal connectors 100 (B-F) "P.U.", 101 (B-F) "S.T." and 102 (B-F) "A.S." respectively.

Figure 4:
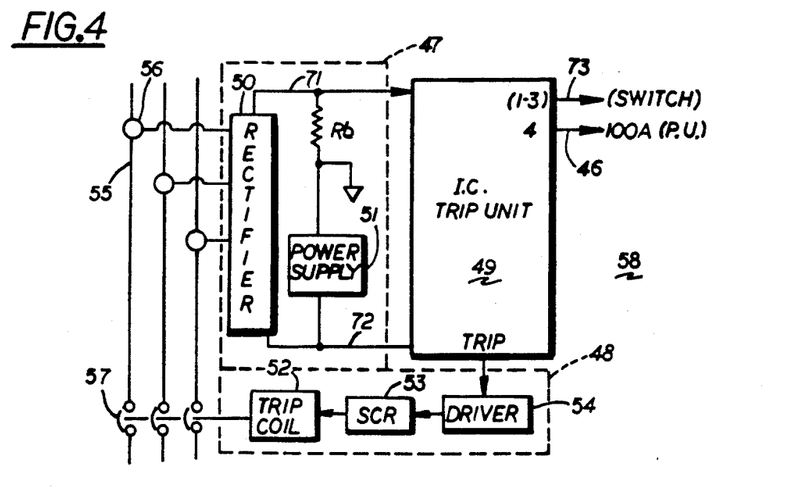
FIG. 4 is a schematic representation of the electronic trip unit used within the branch circuit breaker depicted in FIG. 3.

The trip unit circuit 58 used within the trip unit 37 is depicted in FIG. 4 and includes an integrated circuit trip unit 49 similar to that described within the aforementioned U.S. Pat. No. 4,589,052. The trip unit connects with the multi-phase power conductors 55 and associated current transformers 56 through a signal conditioning circuit 47. The signal conditioning circuit includes a rectifier 50 wherein the current signals are changed to a DC configuration and applied across the rating resistor $R_b$ for providing circuit current data to the trip unit over wire conductor 71. The signal conditioning circuit includes a power supply 51 that derives its operating power from the current transformers and which inputs operating power to the trip unit over conductor 72. As fully described within aforementioned U.S. Pat. No. 4,589,052, a trip actuator circuit 48 controls the condition of the circuit breaker contacts 57 that are serially connected within the multi-phase power conductors 55. A trip output signal from the trip unit controls the driver circuit 54 which connects with the trip coil 52 through an SCR 53 to separate the circuit breaker contacts upon the occurrence of an overcurrent condition of predetermined duration through the multi-phase power conductors. The pin connectors (1–3) on the trip unit connect with an externally accessible switch over conductor 73 to vary the instantaneous and short-time trip parameters stored within the trip unit. Pin connector 4 connects with terminal connection 100A (P.U.) on the branch terminal board 17' over conductor 46 (FIG. 3) for providing information as to the occurrence of a long-time or short-time overcurrent condition occurring on the multi-phase power conductors in a manner to be discussed below in greater detail.

Figure 5:
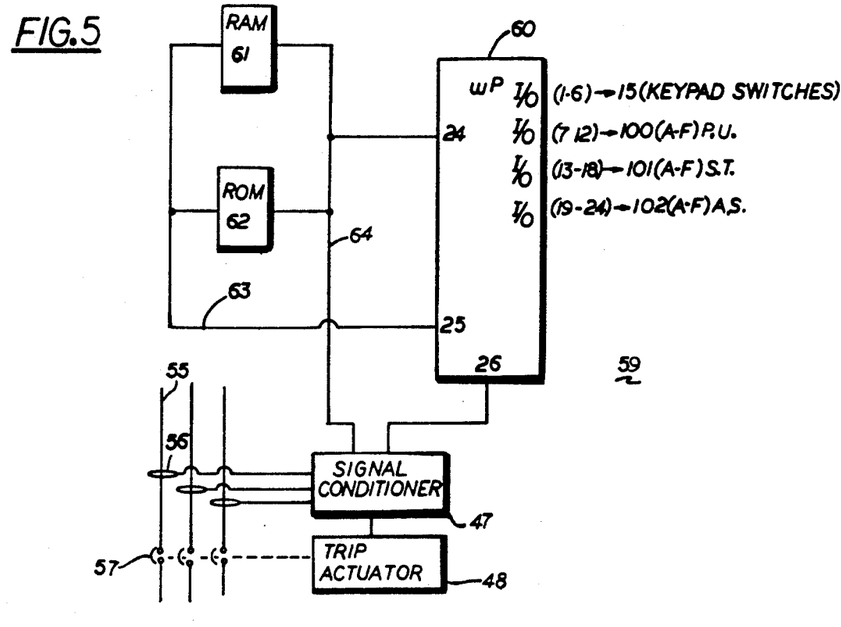
FIG. 5 is a schematic representation of the electronic trip unit used within the main circuit breaker depicted in FIG. 2.

The trip unit circuit 59 depicted in FIG. 5 is used within the trip unit contained within the main circuit breaker 13 shown earlier in FIG. 2 and includes a microprocessor 60 that connects with a similar signal conditioner circuit 47 and trip actuator circuit 48 to separate the circuit breaker contacts 57 serially connected within the multi-phase power conductors 55. The current data through the multi-phase power conductors is transmitted to the microprocessor by means of the current transformers 56, signal conditioner circuit 47 and the wire conductors 64 as indicated. As fully described within the aforementioned U.S. Pat. No. 4,991,042 the operating programs for the microprocessor are stored in the ROM 62 and the trip parameter values are stored in the RAM 61 both of which connect with the microprocessor I/O ports 24, 25 by means of the 12 BIT address and 8 BIT data buses 63, 64. I/O ports 1–6 connect with the externally accessible keypad switches 15 (FIG. 2) to enter and display the trip parameters stored within the RAM 61. I/O ports 7–12 connect with the corresponding pick-up indicating terminal connectors 100 (A–F) "P.U." on the branch terminal boards 17' connected with the branch circuit breakers 21 (A–F) shown in FIGS. 1 and 3. The I/O ports (13–18) connect with the corresponding branch shunt trip terminal connectors 101 (A–F) "S.T." and the I/O ports (19–24) connect with the corresponding branch auxiliary switch terminal connectors 102 (A–F) "A.S" in a manner to be described below in greater detail.

Figure 6:
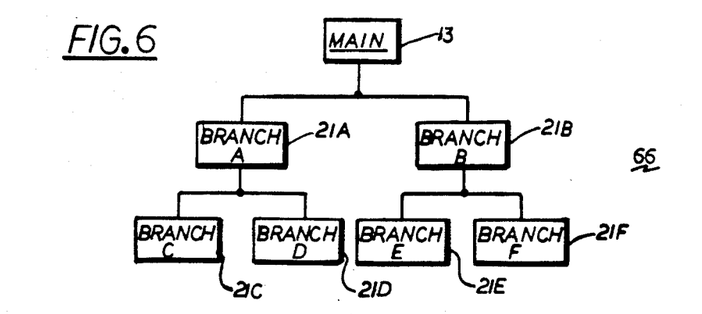
FIG. 6 is a diagrammatic representation of the main and branch circuit breakers depicted within the switchboard or panelboard enclosure of FIG. 1 connected in a double-branch arrangement.

A double-branch circuit arrangement 66 for the main circuit breaker 13 and branch circuit breakers (21A–21F) (FIG. 1) is depicted in FIG. 6. Branch circuit breaker 21A protects branch circuit A which in turn connects in series with branch circuits C, D as indicated. Branch circuit breaker 21B protects branch circuit B which connects in series with branch circuits E and F. The branch circuits (C–F) each include corresponding branch circuit breakers (21C–21F).

The Zone-Selective-Interlock function (Z.S.I.) and Load Selection function (L.S.) for the branch circuit breakers (21A–21F) can be seen by referring now to FIGS. 2, 3, 5 and 6. The main terminal 17 of the main circuit breaker 13 of FIGS. 1 and 2 is arranged such that each of the branch terminal connectors 100 (A–F) "P.U.", 101 (A–F) "S.T.", and 102 (A–F) "A.S." connects with a corresponding main terminal 18 on the main terminal board 17. The Z.S.I. function is performed as follows. Upon occurrence of an overcurrent condition within one of the branch circuit breakers 21C, as shown for example, in FIG. 6, the appropriate signal of the pick-up indication is transmitted from the associated branch terminal board 17' to the main terminal board 17. The microprocessor can then delay operation of the main circuit breaker and activate the actuator-accessory unit within the branch circuit breaker 21C by outputting a shunt trip signal over the appropriate I/O port (13–18) to articulate the operating mechanism and separate the contacts within the branch circuit breaker 21C. The auxiliary switch unit within the branch circuit breaker 21C then closes and outputs an auxiliary switch signal indication to the microprocessor over the appropriate I/O port (19–24) to indicate to the microprocessor that the branch circuit breaker 21C has responded to interrupt the fault. The Z.S.I. function accordingly deters the operation of the upstream branch circuit breaker to allow the downstream branch circuit breaker closest to the fault to interrupt the circuit current.

The L.S. function is performed by assigning the branch circuit breakers 21C, 21D, 21E and 21F a priority with respect to operation. Critical equipment such as emergency lighting, computers and medical equipment are prioritized and peripheral equipment such as air conditioners and machinery are shut down before the critical equipment. When the total current through the branch circuit breakers 21C and 21D exceeds the ampere rating of the upstream branch circuit breaker 21A, a pick-up indication signal is transmitted to the appropriate I/O port (7–12) on the microprocessor 60. The microprocessor then determines whether the downstream circuit breakers 21C, 21D are also experiencing an overcurrent condition. If not, the nonessential equipment is interrupted by actuating the associated actuator-accessory unit in the non-prioritized branch circuit breaker 21C or 21D. The appropriate auxiliary switch signal is transmitted by the branch circuit breaker to the appropriate I/O port (19–24) to signify to the microprocessor that the selected branch circuit breaker has responded.

Figure 7:
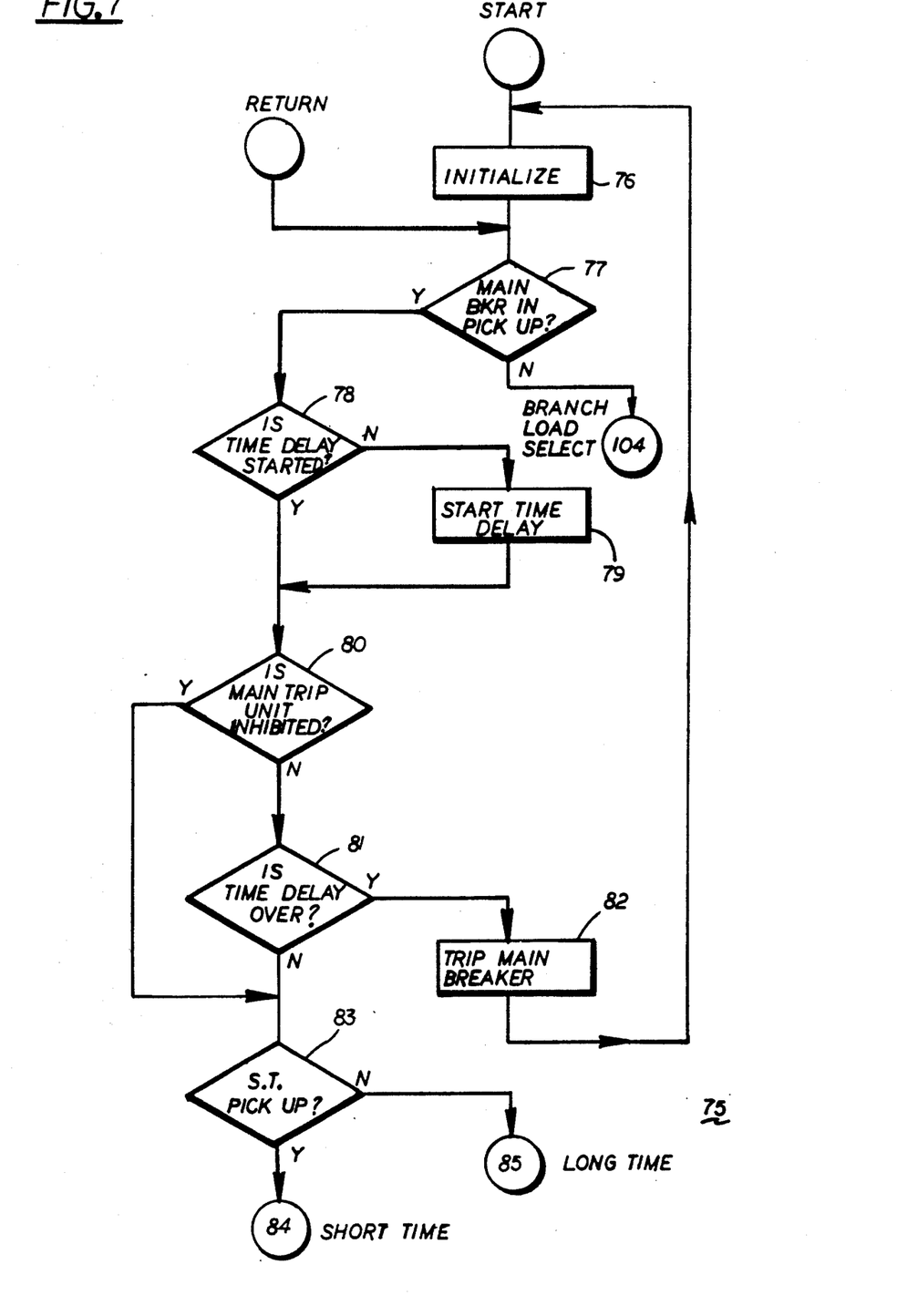
FIG. 7 is a flow chart representation of the control program used with the main and branch circuit breakers within the switchboard or panelboard of FIG. 1.

The instructions to the microprocessor for performing the Z.S.I. functions are depicted in the flow chart diagram 75 as shown in FIG. 7. Upon start-up, the microprocessor is initialized (76) and inquiry is made as to whether the main circuit breaker is in pick-up (77). If it is determined that the main circuit breaker is in pick-up, an inquiry is made as to whether the trip time delay in the main circuit breaker electronic trip unit is started (78). If not, the trip time delay is begun (79). If the trip time delay in the main circuit breaker is started, inquiry is made as to whether the trip response of the main circuit breaker is inhibited (80) and if not, whether the time delay is over (81). If the trip function within the main circuit breaker is inhibited, inquiry is made as to whether the pick-up mode is short-time (83). If the time delay is over, the electronic trip unit within the main circuit breaker is initiated, the main circuit breaker is tripped (82) and the loop is continued by again determining whether the main circuit breaker is in pick-up. If the time delay is not over, the control program continues along branch 84 or branch 85 depending upon the magnitude of the overcurrent condition in the main circuit breaker.

Figure 8:
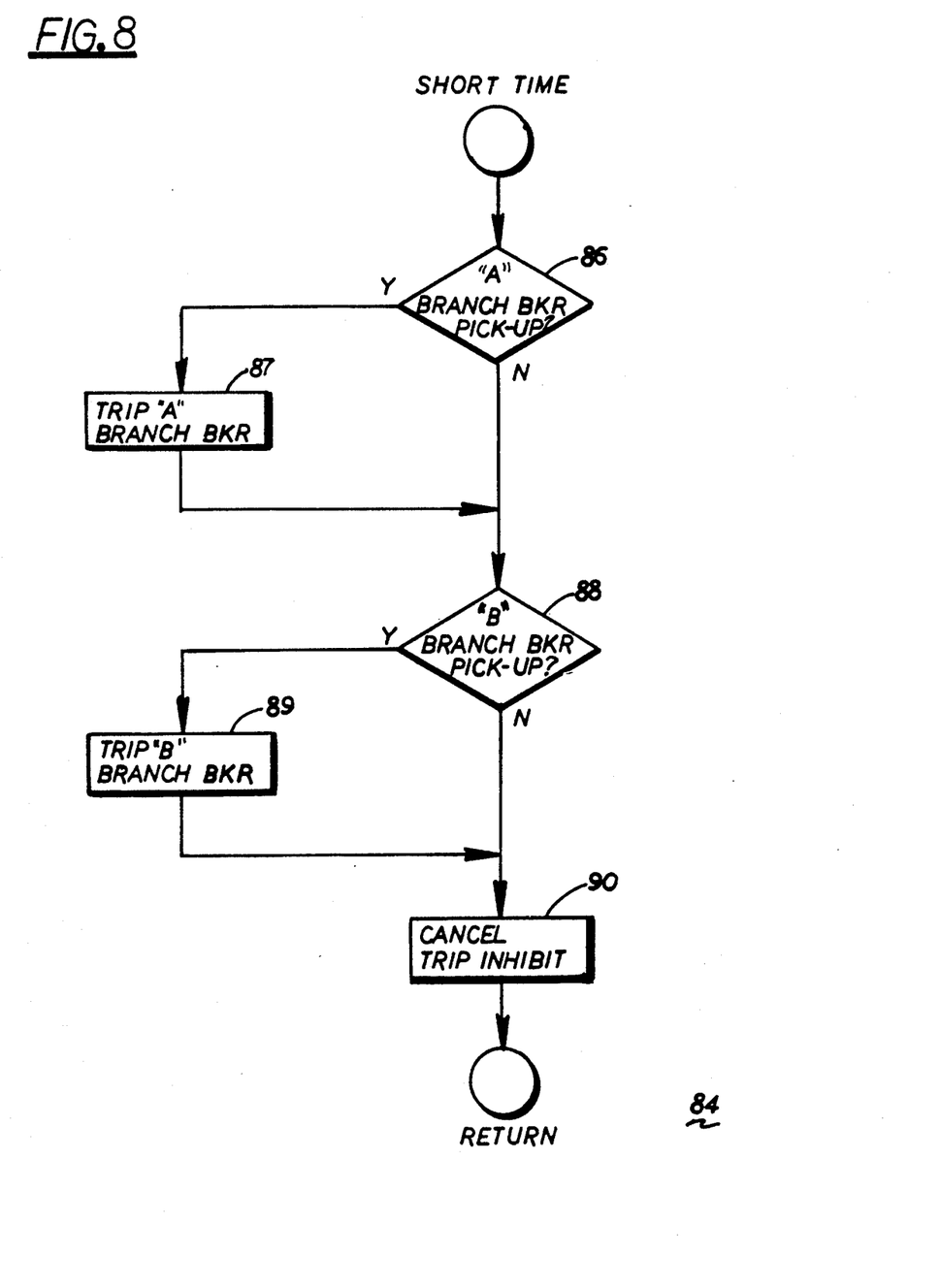
FIG. 8 is a flow chart representation of a Zone-Selective-Interlock program used with the main and branch circuit breaker within the switchboard or panelboard of FIG. 1 when the main circuit breaker is in the short-time pick-up mode.

The short-time delay operating program (84) is depicted in FIG. 8 and determines whether the A branch breaker is in pick-up (86) and if so, a shunt trip signal is inputted to the trip unit of the A branch breaker to trip the A branch breaker (87) and inquiry is made as to whether the B branch breaker is in pick-up (88). If it is determined that the A branch breaker is not in pick-up, and the B branch is in pick-up then the shunt trip signal is inputted to the trip unit within the B branch breaker (89). If the B branch breaker is not in pick-up, the trip inhibit to the main circuit breaker is cancelled (90).

Figure 9:
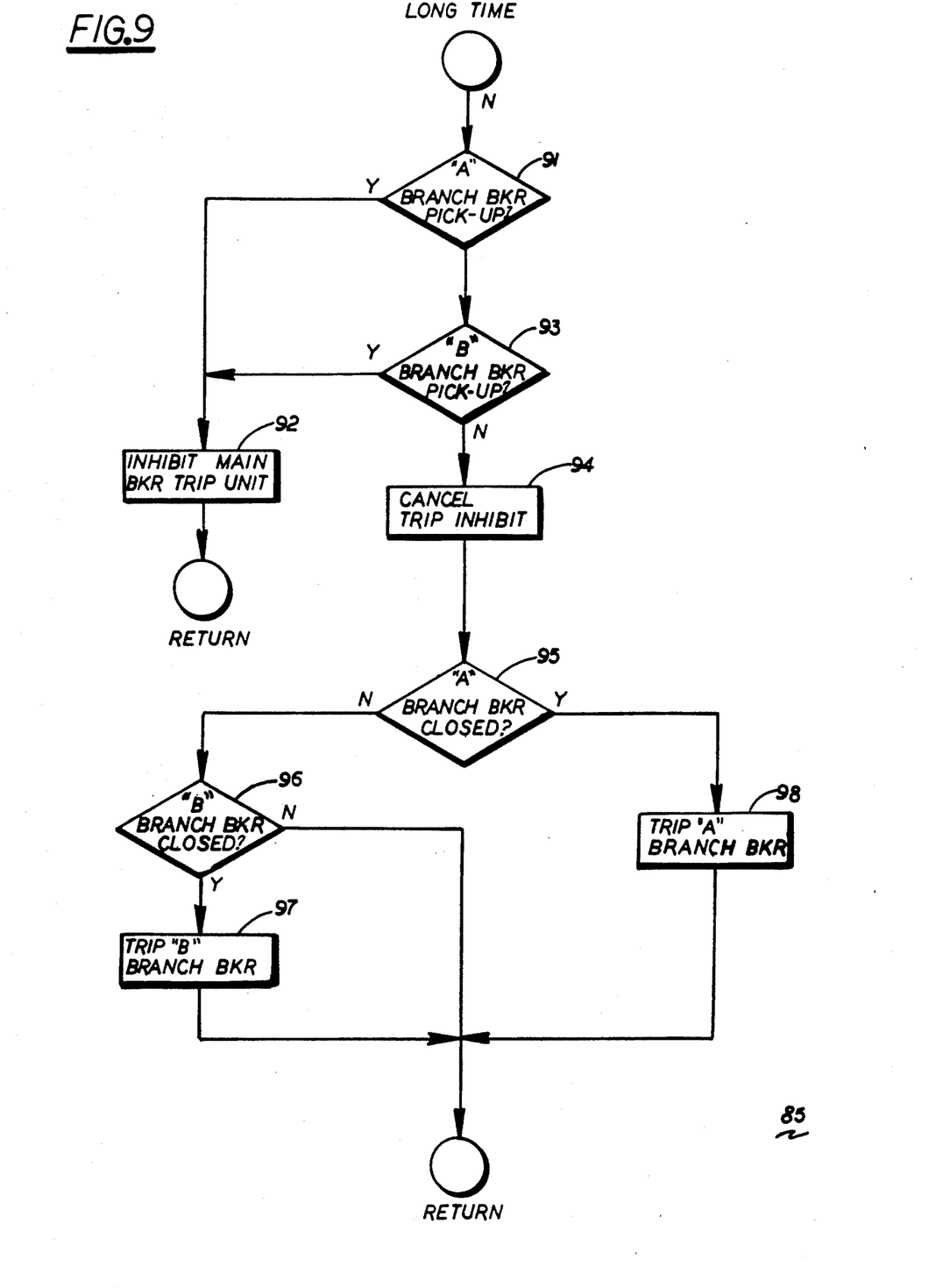
FIG. 9 is a flow chart representation of the Load Selection program and Zone-Selective-Interlock program used with the main and branch circuit breakers within the panelboard or switchboard of FIG. 1, when the main circuit breaker is in the long-time pick-up mode.

The long-time operating program 85 is depicted in FIG. 9 and begins with an inquiry as to whether the A branch breaker is in pick-up (91). If so, the trip unit within the main circuit breaker is inhibited (92). If the A branch breaker is not in pick-up an inquiry is made as to whether the B branch breaker is in pick-up (93). If the B branch breaker is in pick-up, the main breaker trip unit is inhibited (92) and the loop is continued. If the B branch breaker is not in pick-up, the main circuit breaker trip unit inhibit is cancelled (94) and an inquiry is made as to whether the contacts in the A branch breaker are closed (95). If the contacts in the A branch breaker are closed, a shunt-trip signal is inputted to the trip unit within the A branch breaker (98). If the contacts in the A branch breaker are not closed, inquiry is made as to whether the contacts in the B branch breaker are closed (96). If the contacts in the B branch breaker are closed, a shunt-trip signal is inputted to the trip unit within the B branch breaker (97).

Figure 10:
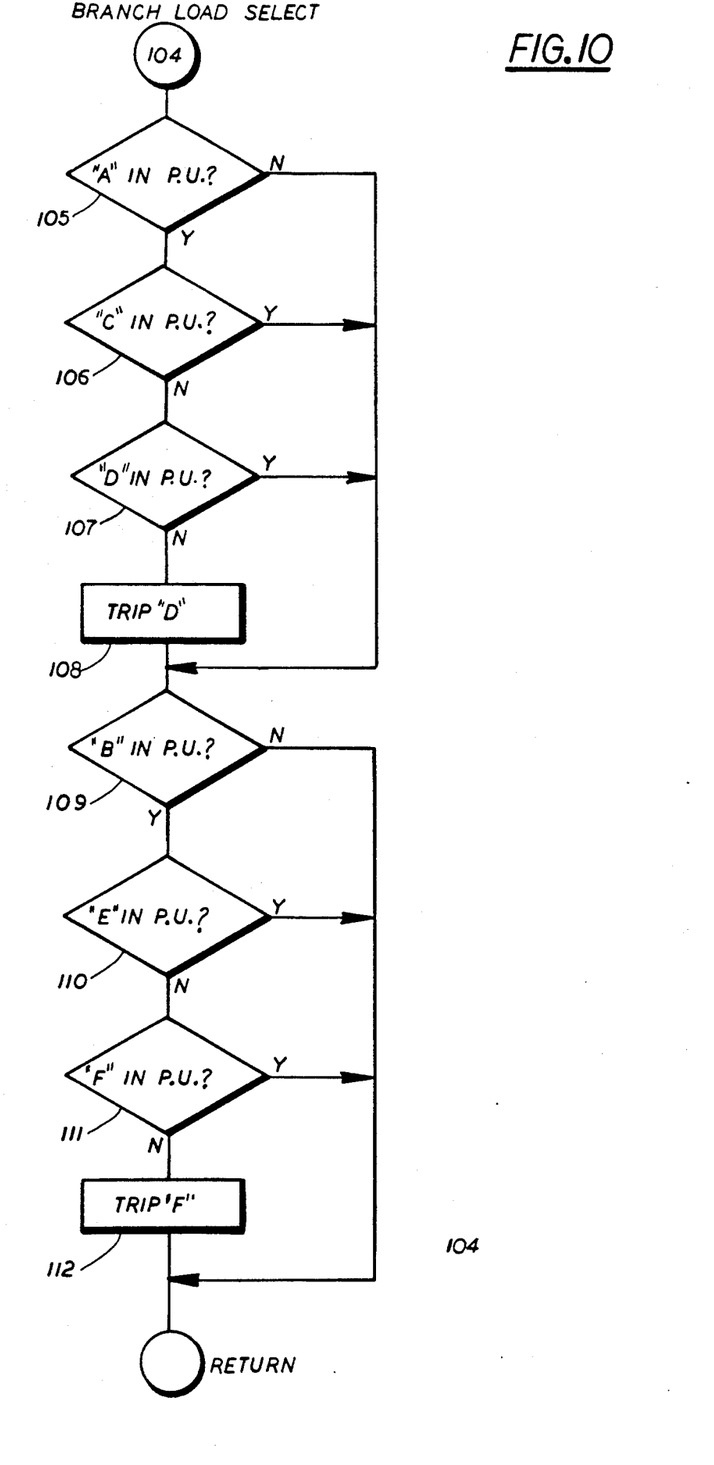
FIG. 10 is a flow chart representation of the Load Selection program used with the main and branch circuit breakers within the panelboard or switchboard of FIG. 1.

The branch Load Selection programs controlling the microprocessor 60 of FIG. 5 for the main and branch circuit breakers depicted earlier in FIG. 6 are depicted in FIGS. 7 and 10 as follows. When it is determined that the main breaker is not in pick-up (77) the branch load select flow diagram (104) is initiated whereby an inquiry is made as to whether the A branch circuit breaker is in pick-up (105) and if so, whether the C branch circuit breaker is in pick-up (106). If the C branch circuit breaker is not in pick-up, an inquiry is made as to whether the D branch circuit breaker is in pick-up (107) and if not, a shunt trip signal is inputted to the trip unit within the D branch circuit breaker (108). If the A branch circuit breaker is in pick-up and either the C branch circuit breaker or the D branch circuit breaker is in pick-up, then inquiry is made as to whether the B branch circuit breaker is in pick-up. If the A branch circuit breaker is not in pick-up, inquiry is made as to whether the B branch circuit breaker is in pick-up (109) and if so, inquiry is made as to whether the E branch circuit breaker is in pick-up (110). If the E branch circuit breaker is not in pick-up, inquiry is made whether the F branch circuit breaker is in pick-up (111) and if not, a shunt trip signal is inputted to the trip actuator within the F branch circuit breaker (112). If the E branch circuit breaker is in pick-up, or the F branch circuit breaker is in pick-up, the loop is continued.

It has accordingly been shown that a "smart" circuit breaker employing a microprocessor and related ROM and RAM memory can include internal operating programs and external terminal connections with circuit interrupters having an electronic trip unit and an electrically actuated accessory-actuator unit. When a plurality of such electronic circuit breakers are connected within a common enclosure, the associated terminal connector boards are interconnected with the smart circuit breaker in a "master-slave" relation whereby the smart circuit breaker controls the tripping sequence of the branch circuit breakers for Zone-Selective-Interlock and Load Selection functions.

Having thus described our invention, what we claim as new and desire to secure by Letters Patent is:

1. A circuit breaker interconnect arrangement comprising in combination:
    a main circuit breaker having a main electronic trip unit including a microprocessor, said main circuit breaker arranged for interrupting current through a protected main circuit;
    a main terminal board connecting with said microprocessor and with a plurality of main terminals arranged on said main terminal board;
    a first branch circuit breaker having an associated first electronic trip unit and a first actuator unit, said first trip unit having first indicating means outputting a first pick-up signal indicating the occurrence of an overcurrent condition through an associated first branch circuit, said first actuator unit having means for interrupting current through said first branch circuit; and
    a first branch terminal board connecting with said first electronic trip unit, said first actuator unit and said main terminal board whereby said microprocessor inputs a first trip signal to said first actuator unit to interrupt current through said first branch circuit upon receipt of said first pick-up signal, wherein said first pick-up signal is received by said microprocessor when said main trip unit is in pick-up whereby said main trip unit is deterred from interrupting said main circuit until said first trip signal interrupts said first branch circuit.

2. A circuit breaker interconnect arrangement comprising in combination:
    a main circuit breaker having a main electronic trip unit including a microprocessor, said main circuit breaker arranged for interrupting current through a protected main circuit;
    a main terminal board connecting with said microprocessor and with a plurality of main terminals arranged on said main terminal board;
    a first branch circuit breaker having an associated first electronic trip unit and a first actuator unit, said first trip unit having first indicating means outputting a first pick-up signal indicating the occurrence of an overcurrent condition through an associated first branch circuit, said first actuator unit having means for interrupting current through said first branch circuit; and
    a first branch terminal board connecting with said first electronic trip unit, said first actuator unit and said main terminal board whereby said microprocessor inputs a first trip signal to said first actuator unit to interrupt current through said first branch circuit upon receipt of said first pick-up signal, wherein said first pick-up signal is received by said microprocessor when said main trip unit is not in pick-up whereby said first trip unit interrupts said first branch circuit before said microprocessor inputs said first trip signal.

3. A circuit breaker interconnect arrangement comprising in combination:
    a main circuit breaker having a main electronic trip unit including a microprocessor said main circuit breaker arranged for interrupting current through a protected main circuit;
    a main terminal board connecting with said microprocessor and with a plurality of main terminals arranged on said main terminal board;
    a first branch circuit breaker having an associated first electronic trip unit and a first actuator unit, said first trip unit having first indicating means outputting a first pick-up signal indicating the occurrence of an overcurrent condition through an associated first branch circuit, said first actuator unit having means for interrupting current through said first branch circuit;
a first branch terminal board connecting with said first electronic trip unit, said first actuator unit and said main terminal board whereby said microprocessor inputs a first trip signal to said first actuator unit to interrupt current through said first branch circuit upon receipt of said first pick-up signal;
a second branch circuit breaker having an associated second electronic trip unit and a second actuator unit, said second trip unit having means outputting a second pick-up signal indicating the occurrence of an overcurrent condition through an associated second branch circuit, said second actuator unit having second indicating means interrupting current through said second branch circuit; and
a second branch terminal board connecting with said second electronic trip unit, said second actuator unit and said main terminal board whereby said microprocessor inputs a second trip signal to said second actuator unit to interrupt current through said second branch circuit upon receipt of said second pick-up signal, wherein said first and second branch circuit breakers are assigned first and second priorities whereby when said main trip unit is in pick-up and neither said first nor second trip units are in pick-up, said main trip unit thereby transmits a trip signal to said second trip unit to interrupt said second branch circuit.

4. A circuit breaker interconnect arrangement comprising in combination:
a main circuit breaker having a main electronic trip unit including a microprocessor said main circuit breaker arranged for interrupting current through a protected main circuit;
a main terminal board connecting with said microprocessor and with a plurality of main terminals arranged on said main terminal board;
a first branch circuit breaker having an associated first electronic trip unit and a first actuator unit, said first trip unit having means outputting a first pick-up signal upon occurrence of an overcurrent condition through an associated first branch circuit, electrically in series with said main circuit said first actuator unit having means for interrupting current through said first branch circuit;
a first branch terminal board connecting with said first electronic trip unit, said first actuator unit and said main terminal board;
a second branch circuit breaker having an associated second electronic trip unit and a second actuator unit, said second branch circuit breaker being electrically in series with said main circuit breaker and said first branch circuit breaker, said second trip unit having means outputting a second pick-up signal upon the occurrences of an overcurrent condition through an associated second branch circuit, said second actuator unit having means for interrupting current through said second branch circuit;
a second branch terminal board connecting with said second electronic trip unit, said second actuator unit and said main terminal board;
a third branch circuit breaker having an associated third electronic trip unit and a third actuator unit, said third branch circuit breaker being electrically in parallel with said second branch circuit breaker, said third branch circuit breaker having means outputting a third pick-up signal upon occurrence of an overcurrent condition through a third branch circuit, said third actuator unit having means for interrupting current through said third branch circuit; and
a third branch terminal board connecting with said third electronic trip unit, said third actuator unit and said main terminal board whereby said microprocessor inputs a trip signal to said second actuator unit to interrupt said second associated branch circuit upon receipt of said first pick-up signal.

5. The circuit breaker interconnect arrangement of claim 4 wherein said third associated branch circuit is electrically connected with prioritized electrical equipment.

* * * * *